United States Patent [19]

Herring

[11] 4,256,057
[45] Mar. 17, 1981

[54] GANG SLAT FOR FLOORING OF AN ANIMAL SHELTER AND HAVING A WASTE-PASSAGE GRATE

[76] Inventor: William T. Herring, P. O. Box 181, Newton Grove, N.C. 28366

[21] Appl. No.: 79,484

[22] Filed: Sep. 27, 1979

[51] Int. Cl.³ .................... A01K 1/015; A01K 1/02
[52] U.S. Cl. ........................................... 119/28
[58] Field of Search ........................... 119/28, 20, 16

[56] References Cited

U.S. PATENT DOCUMENTS

| | | | |
|---|---|---|---|
| 3,213,828 | 10/1965 | Sorensen | 119/28 X |
| 3,584,603 | 6/1971 | Rutherford | 119/16 |
| 3,905,334 | 9/1975 | Stevenson | 119/28 |
| 4,183,324 | 1/1980 | Nobbe | 119/28 X |

*Primary Examiner*—Hugh R. Chamblee
*Attorney, Agent, or Firm*—Bell, Seltzer, Park & Gibson

[57] ABSTRACT

A reinforced concrete gang slat, for use as a section of the flooring of an animal shelter, such as a farrowing house for swine, wherein the gang slat is adapted to support thereon a farrowing crate confining a sow therein, and wherein the gang slat is provided with an opening in a rear portion thereof which underlies the rear portion of the farrowing crate and the sow therein and has a grate positioned therein, with the openings in the grate being sufficiently small so as to permit a litter of pigs to be born thereon and to walk thereon without injury as by their feet being caught in the openings of the grate, and wherein the openings in the grate are of sufficient size for readily permitting the sow's and the newborn pigs waste to pass therethrough.

14 Claims, 8 Drawing Figures

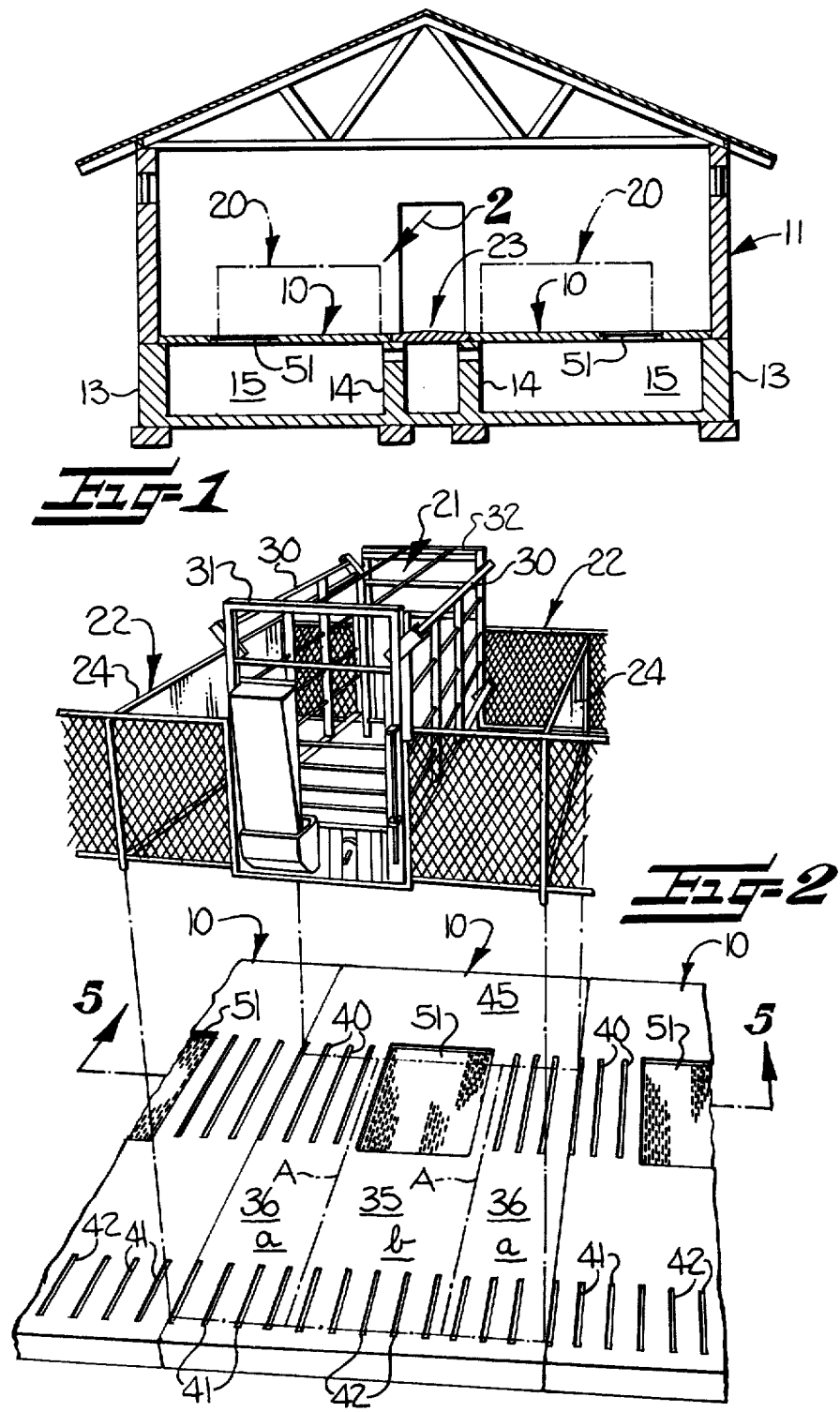

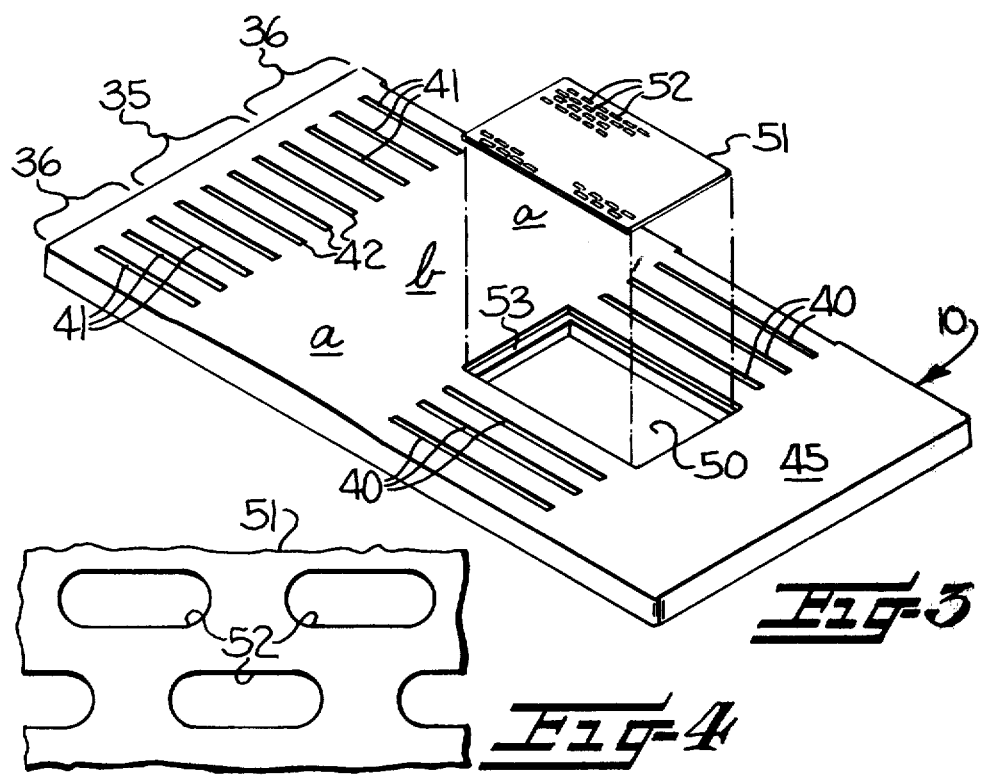
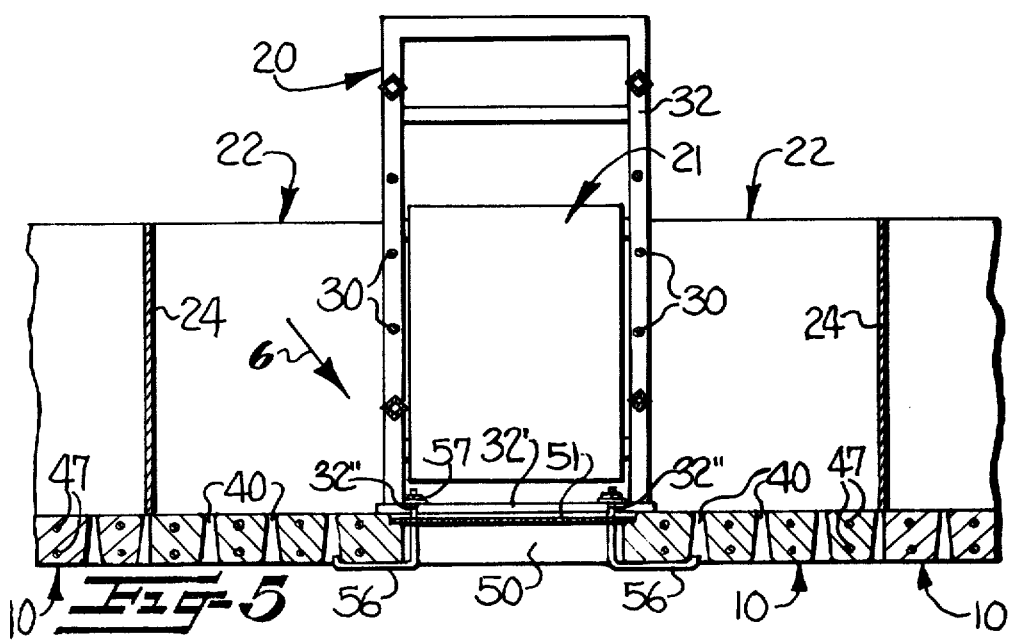

GANG SLAT FOR FLOORING OF AN ANIMAL SHELTER AND HAVING A WASTE-PASSAGE GRATE

FIELD OF THE INVENTION

This invention relates to animal shelters, such as farrowing houses for swine, and more especially, to an improved gang slat for use as a section of the floor of such an animal shelter, which gang slat underlies and supports thereon a farrowing crate with a sow in its central portion, and wherein the rear portion of the central section of the gang slat has an opening with a grate therein for accommodating pigs thereon during birth and initial growth of the pigs.

BACKGROUND OF THE INVENTION

The use of gang slats for slotted floor sections in animal shelters of the farrowing house type has been well accepted by the swine production industry. As is known to those familiar with the applicable arts, in a typical farrowing house utilizing contemporary gang slats for the flooring thereof, each such gang slat supports a farrowing crate thereon having a central pen for confining a sow therein and side pens extending along opposite sides of the central pen for accommodating a litter of pigs. The litter has access to the sow for feeding by passing under a divider extending between the central pen and each side pen. Generally, the farrowing crates and respective gang slats are arranged in side-by-side relation in each of two rows, with a center aisle between the rows providing access to the front portions of the farrowing crates.

The gang slats are supported at opposite ends on the peripheral and central walls of the farrowing house in spaced relation to, and above, the ground surface to form a pit beneath the flooring, and each gang slat has a plurality of slots therein for passage therethrough of waste from the sow and the litter of pigs in the respective farrowing crate to the pit therebelow. The slotted gang slats thus reduce cleaning and also greatly retard the spread of disease and parasites by allowing removal of excrement from the farrowing crates. Also, the slotted floor formed of the gang slats is an essential component in controlling the atmospheric environment of the farrowing house, in that air circulates downwardly through the slots to control the temperature and diffusion of odors.

Known gang slats, such as those discussed above, generally include a slotted central section of reinforced concrete for supporting the sow and the central pen of a farrowing crate thereon, and they also include slotted opposing side sections of reinforced concrete, integral with the central section, for supporting the farrowing crate side pens and the litter of pigs thereon. Most of the slots in the gang slat are relatively narrow, usually being about ⅜ inch (9.53 mm) wide, and thus have presented only a minimal hazard to the safety of the pigs in the litter. However, in order to permit the sow's waste to more readily pass through the gang slat to the pit below, each gang slat, heretofore, has been provided with a group of relatively wider slots in a rear portion of the central section of the gang slat. Such wider slots usually have been about one inch (25.4 mm) wide. It is apparent that the feet and legs of newborn pigs would easily be caught in such relatively wide slots and would result in serious injury or death of the pigs.

In attempting to avoid the problem presented by the relatively wide slots in the gang slat, it has been a common practice for the farmer to temporarily place a mesh grate upon the gang slat and overlying the area of wide slots. Such mesh grate has relatively small openings therein and has served to protectively receive newborn pigs thereon and permit them to walk about thereon without injury to their feet or legs. About three days after the pigs are born, at which time they will have grown sufficiently in size and stability so they are able to maintain their footing on the surface of the gang slat, it is desirable that the mesh grate be removed from the gang slat.

It is apparent that, because the mesh grate overlies substantial solid portions of the gang slat, this results in waste from the pigs and the sow being prevented from passage through the substantial mesh portions of the grate overlying the solid portions of the gang slat. This problem is becoming increasingly significant because it frequently happens that an attendant is reluctant to remove such mesh grates, and instead, leaves them in place and attempts to periodically wash the excess waste from the grates and through the slots in the gang slats. Consequently, excessive amounts of waste tend to accumulate on the grates, especially on those portions of the grates which overlie the solid portions of the gang slat, and on other adjacent areas of the gang slats, and may not be removed until a general cleaning of the entire farrowing crate area may be expected, probably after the sow and the litter of pigs are removed from the respective farrowing crate.

SUMMARY OF THE INVENTION

With the foregoing in mind, it is the primary object of this invention to provide an improved reinforced concrete gang slat which is constructed so as to avoid the need for the prior practice of temporarily placing a mesh grate over slotted rear portions of the gang slat to protect the feet and legs of pigs during birth and initial growth of the pigs.

According to the invention a gang slat is provided whose rear portion has an opening therein in which a grate means is positioned, and wherein the openings in the grate means are sufficiently small so as to permit the litter of pigs to be born thereon and walk thereon without injury as by their feet being caught in the openings of the grate means, and wherein the openings are of sufficient size for readily permitting the sow's and the newborn pigs' waste to pass therethrough.

BRIEF DESCRIPTION OF THE DRAWINGS

Some of the objects of the invention having been stated, others will appear as the description proceeds, when taken in connection with the accompanying drawings, in which:

FIG. 1 is a transverse vertical sectional view through a farrowing house or facility utilizing the improved gang slats for the floor thereof and showing farrowing crates thereon in broken lines;

FIG. 2 is an enlarged, partially exploded, fragmentary perspective view of the improved floor section or gang slat of the present invention, looking generally in the direction of the arrow 2 in FIG. 1, and illustrating the positional arrangement of a typical farrowing crate with respect to the gang slat;

FIG. 3 is an enlarged perspective view of one of the improved gang slats showing the grate means in exploded relation to the gang slat;

FIG. 4 is an enlarged fragmentary plan view of a portion of the grate means illustrating a preferred arrangement of the openings therethrough;

FIG. 5 is an enlarged fragmentary vertical sectional view taken substantially along line 5—5 in FIG. 2 and showing how the farrowing crate and the grate means may be attached to the gang slat;

DETAILED DESCRIPTION

Figure 6:
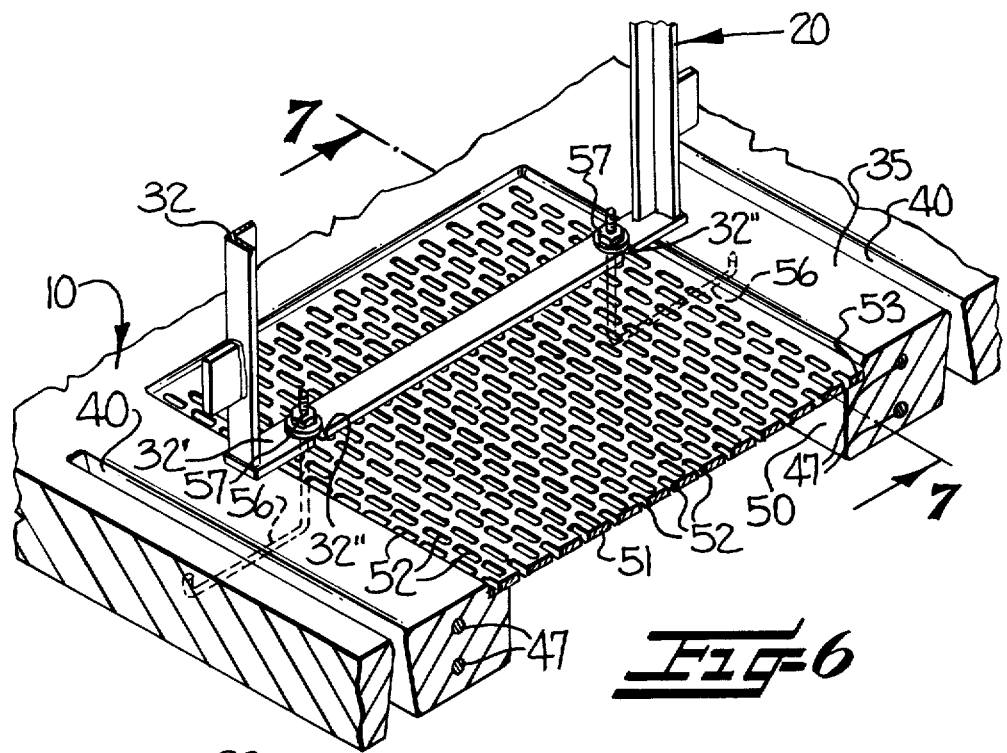
FIG. 6 is a further enlarged fragmentary perspective view looking generally in the direction of the arrow 6 of FIG. 5.

While the present invention will be described hereinafter with particular reference to the accompanying drawings, in which an illustrative embodiment of the present invention is set forth, it is to be understood at the outset of the description which follows that it is contemplated that persons skilled in the applicable arts may modify the specific details to be described while continuing to use this invention. Accordingly, the description is to be understood as a broad teaching of this invention, directed to persons skilled in the applicable arts.

Referring more specifically to the drawings, the gang slat of the present invention, broadly designated at 10, is particularly devised for use as a floor section in an animal shelter or farrowing house for newborn pigs. Accordingly, as an illustrative environmental setting for the present invention, a typical farrowing house is shown in FIG. 1 broadly designated at 11 and including peripheral or outside walls 13 and center walls 14 that extend longitudinally along the length of the farrowing house. The gang slats 10 are formed from reinforced concrete and are supported at their opposite ends on the associated peripheral walls 13 and center walls 14. The gang slats are positioned adjacent or in abutting side-by-side relation to each other in opposing rows extending along the length of the farrowing house 12. Thus, waste-receiving pits 15 are formed below the flooring formed of the gang slats 10 and between the peripheral walls 13 and the adjacent center walls 14 for purposes of collection of the pigs' waste, as will be later described.

The farrowing house 11 also includes a plurality of farrowing crates 20 for confinement of the sow and litter therein. Each farrowing crate 20 includes a central pen 21 (FIG. 2) in which the sow is confined, and side pens 22 extending along opposite sides of the central pen to contain the newborn litter of pigs therein in close proximity to the sow.

The farrowing crates 20 are arranged in two spaced apart opposing rows extending along the length of the farrowing house 11, there being one of the farrowing crates supported on each respective gang slat 10, with the front ends of the crates 20 in the two rows facing inwardly toward a center aisle 23 therebetween for ready access thereto. A suitable fence or barrier wall member 24, preferably of solid construction, separates adjacent farrowing crates 20 from one another and serves to limit contact between the pigs to retard the spread of contagious diseases and to promote the health and development of the litter.

Each farrowing crate 20 includes generally skeletal opposite side walls 30 and front and rear end walls 31, 32, the side walls 30 serving as dividers separating the central pen 21 and the adjacent side pens 22 so that the sow cannot enter the area in which the litter is contained. As is usual, the lower edge of each divider or side wall 30 is spaced above the lower edges of the front and rear end walls 31, 32 (see FIG. 5) so that the newborn pigs can readily obtain access to the sow. Also, the raised lower edges of the dividers or side walls 30 of each crate 20 permit the pigs in the litter to move from one side pen 22 to the other side pen on the opposite side of the central pen 21 and within the same farrowing crate 20. Thus, the pigs in the litter have access to either side of the sow according to which side is exposed when the sow lies within the central pen 21.

Since a single farrowing crate 20 is supported upon each gang slat 10, it will be observed, with particular reference to FIG. 2, that each gang slat 10 comprises a longitudinally extending central section 35 and opposing side sections 36 formed integrally with and extending along opposite sides of the central section 35. The central section 35 is adapted to support the sow in the central pen 21 of the respective farrowing crate 20, and the opposing side sections 36 are adapted to support the litter in the side pens 22 of the associated farrowing crate 20. Typically, the gang slat 10 has an overall size of about five feet in width and about ten feet in length. It is apparent, with reference to FIG. 2, that the width of the farrowing crate 20 is substantially the same as that of the gang slat 10, and the central pen 21 of the farrowing crate overlies only the central section 35 of the gang slat. The side pens 22 of the farrowing crate overlie only the side sections 36 of the gang slat. As represented by the broken lines A in FIG. 2, which is a projection of the dividers or side walls 30 of the farrowing crate 20 on the gang slat 10, it is apparent that the dividers not only separate the central and side pens 21, 22 but also serve to define the junctures of the central section 35 and the side sections 36 of the gang slat 10.

As best shown in FIGS. 2 and 3, each of the opposing side sections 36 of the gang slat 10 is provided with a plurality of openings in the form of longitudinally extending relatively narrow slots therein for passage of waste from the litter of pigs in the side pens 22 through the gang slat 10 to the pit 15 (FIG. 1) therebelow. Rear and front groups of such slots, indicated at 40, 41, are provided in each side section 36 and are spaced apart longitudinally of the gang slat so as to provide a solid surface portion a of the gang slat between the proximal ends of the slots 40, 41 and on which the newborn pigs can comfortably lie.

Since the pigs may walk across the central section 35 in front of the sow in the central pen 21, the forward or front portion of the central section 35 of the gang slat 10 also is provided with a plurality or group of openings in the form of longitudinally extending slots 42 therein which are also provided for the passage of waste from the litter of pigs through the gang slat to the pit 15 therebelow. The slots 42 may be of about the same length as slots 41 so that the front slots 41 in the opposing side sections 36 and the slots 42 in the central section 35 of the gang slat 10 collectively define a transverse row of spaced apart, elongate relatively narrow slots over which the pigs may walk without their legs and feet being caught in the slots, and through which waste from the litter of pigs will readily pass to the bit 15. Typically, all the slots 40, 41, 42 are about $\frac{3}{8}$ inch (9.53 mm) wide. A medial solid surface portion b (FIG. 2) is provided rearwardly of slots 42 in the central section 35 of the gang slat 10 and on which solid surface portion b the sow and its litter may comfortably lie. It is apparent that the solid surface portions a, b collectively form a single solid surface area extending across the gang slat from side-to-side thereof, as best illustrated in FIG. 3.

To lend strength to the concrete gang slat 10, it is preferred that the front ends of the slots 41, 42 are closed in that they terminate rearwardly of the front edge of the gang slat 10. Similarly, the rear ends of the rear slots 40 in the opposing side sections 36 of gang slat 10 also terminate forwardly of the rear edge of the gang slat 10. In fact, in the illustrated embodiment of the gang slat 10, the gang slat further comprises an optional rear end section 45 which defines the corresponding end of the gang slat and is integrally formed with the central section 35 and side sections 36 and extends along one end of such sections. The rear end section 45 is adapted to be positioned largely or entirely exteriorly of the rear end of the farrowing crate 20. Thus, the rear end sections 45 of the gang slats 10 serve for defining a side aisle for permitting access to the rear portions of the farrowing crates 20 in the farrowing house 11.

As indicated earlier herein, each gang slat 10 is integrally formed from reinforced concrete. Accordingly, the central section 35 and side sections 36 of the gang slat are integrally formed with each other. To provide the desired structural strength to the gang slat 10, reinforcing rods 47 (FIGS. 5-8) are arranged in upper and lower networks and embedded within gang slat 10. Predominantly, the reinforcing rods 47 extend longitudinally of the gang slat and within the solid slat portions thereof defined between the slots 40, 41, 42. Reinforcing rods 48 (FIGS. 7 and 8) are also positioned transversely within the ends of the gang slat and across the solid central portion thereof shown in FIGS. 2 and 3, all for the purpose of providing further strength to the gang slat 10.

In the manufacture of gang slats heretofore, which are of the general type described up to this point, it has been conventional practice to provide a plurality or group of longitudinally extending slots in the rear portion of the central section of a gang slat and which were relatively wide and were positioned between the groups of rear slots 40 (FIGS. 2, 3 and 5), for example, appearing in the two side sections 36 of the present gang slat 10. Thus, the sow would be positioned within the central pen so that the wider slots last mentioned were positioned underneath rear portions of her body for readily receiving the deposited waste therethrough for passage into the pit therebelow.

It can be appreciated, however, that during birth and initial growth of the litter of pigs, the slots in the rear portion of the central section of the prior type of gang slat would present a serious hazard to the pigs, and therefore, it has been the prior practice to temporarily place a mesh grate over the slotted rear portion of the central section of the gang slat to protect the feet and legs of the pigs during birth and initial growth thereof. Such mesh grate has relatively small openings therein and has served to protectively receive newborn pigs thereon and permit them to walk about thereon without injury to their feet or legs. About three days after the pigs are born, at which time they will have grown sufficiently in size and stability so that they are able to maintain their footing on the surface of the gang slat, it is apparent that it is desirable that the grate be removed from the gang slat, since the presence of the mesh grate overlying the gang slat results in waste from the pigs being impeded in its passage therethrough. Since it frequently happens that an attendant or farmer is reluctant to remove the mesh grate at the time that it is supposed to have been removed, and thus leaves the grate in place for a substantial period of time, and then attempts to periodically wash the excess waste from the grate and through the slots in the gang slat, it is apparent that excessive amounts of waste tend to accumulate on the prior art grate and adjacent areas of the gang slat and may not be removed until such time as a general cleaning of the entire farrowing crate area may be expected, probably after the sow and the litter of pigs are removed from the farrowing crate.

According to the present invention, in order to avoid the need for the prior practice of temporarily placing a mesh grate over slotted rear portions of the gang slat for protecting the feet and legs of the pigs during birth and initial growth of the pigs, the rear portion of the central section 35 of the gang slat 10 has a relatively large opening 50 therein (see FIGS. 2, 3 and 6) which is preferably substantially rectangularly shaped and is of about the width of the central pen 21 of the farrowing crate 20. As shown, the length of the opening 50 is substantially the same as the length of the slots 40 in the side sections 36 of the gang slat 10 and which length may be somewhat greater than the width of the central pen 21. The width of the central section 35 of the gang slat 10 is preferably approximately the same as the width of the central pen 21 of the respective farrowing crate 20. In a typical gang slat 10 constructed in accordance with the present invention, the size of the opening 50 provided therein was approximately eighteen inches (45.72 cm) wide and approximately thirty inches (76.2 cm) long. In any event, it is preferred that the opening 50 is of sufficient size so that an attendant may pass therethrough for gaining access to the pit 15 for washing down the pit area or for performing other corrective work.

Grate means is carried by the rear portion of the gang slat central section 35 and is positioned in the opening 50, with openings being provided in the grate means which are sufficiently small so as to permit the litter of pigs to be born thereon and walk thereon without injury, as by their feet being caught in the openings, and wherein the openings are of sufficient size for readily permitting the sow's and the newborn pigs' waste to pass therethrough. Accordingly, the grate means is best shown in FIGS. 2, 3 and 6 in the form of a substantially rectangular grate 51 which may be formed of sheet metal at least about $\frac{1}{8}$ inch (3.18 mm) thick so as to provide adequate support for the sow in the central pen 21 of the respective farrowing crate 20. The grate 51 is provided with openings 52 which may be of any desired shape and size provided that they are sufficiently small to permit the litter of pigs to be born thereon and walk thereon without injury, as by their feet being caught in the grate openings, and are of sufficient size and number to assure passage of the sow's and the newborn pigs' waste therethrough.

In the preferred embodiment of the grate 51, and as best shown in FIGS. 4 and 6, it will be observed that the openings 52 are elongate in the longitudinal direction of the grate 51 and the gang slat 10, and they are arranged in closely spaced relationship. Preferably, each opening 52 is no wider than about $\frac{3}{8}$ inch (9.53 mm), and each opening may be about one inch (25.4 mm) long with the openings 52 being generally uniformly distributed over the grate 10. The combined open area of the openings should be at least equal to about thirty percent (30%) of the effective area of the grate 51. It is contemplated that, alternatively, the grate may be formed of expanded metal having openings of generally the size described above.

For supporting grate 51, the rear portion of the gang slat central section 35 is provided with shoulder means 53 at least partially defining the perimeter of the substantially rectangular opening 50 and being recessed relative to the upper surface of the gang slat 10. As shown in FIGS. 3 and 5–8, the shoulder means 53 is in the form of a groove extending around the upper surface portions of the gang slat 10 defining the edges of the opening 50, with the edge portions of the grate 51 being engagingly supported upon the shoulder means 53.

It is preferred that the grate 51 fits loosely in the opening 50 and is supported on the shoulder means 53 for ready removal of the grate 51 from the opening 50. Further, it is preferred that the shoulder means 53 is recessed relative to the upper surface of the gang slat 10 to a depth at least equal to or greater than the thickness of the grate 51. Thus, the upper surface of the grate 51 will be positioned no higher than the upper surface of the gang slat. By recessing the shoulder means 53 in this manner, it can be appreciated that the sow in the central pen 21 of the farrowing crate 20 will be unable to kick the grate 15 out of its desired position relative to the gang slat 10. Further, by recessing the shoulder means 53 to a depth substantially greater than the thickness of grate 51, as desired, the waste from the sow and the litter of pigs will not be scattered over the surface of the gang slat as easily as would be the case in the event of the upper surface of the grate 51 being substantially flush with the upper surface of the gang slat 10.

Figure 7:
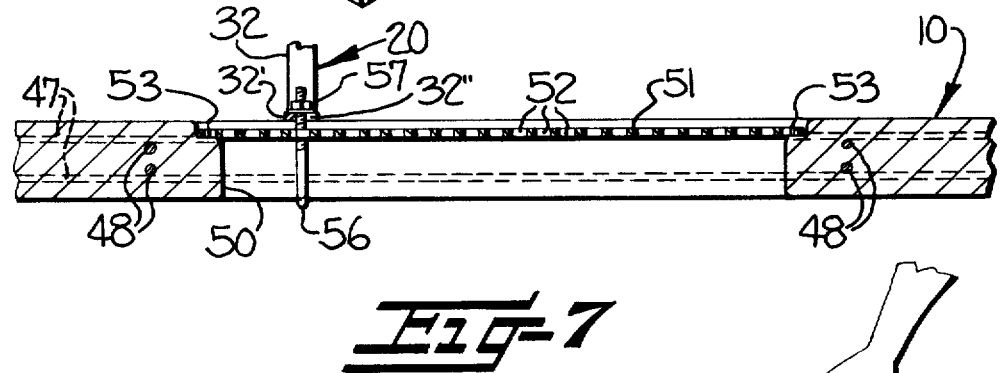
FIG. 7 is a fragmentary vertical sectional view looking substantially along line 7—7 in FIG. 6.

As an aid to further removably securing the grate 51 in the opening 50, and as a convenient means for aiding in securing the corresponding farrowing crate 20 on the respective gang slat 10, a common fastening means may be employed such as that illustrated in FIGS. 6 and 7, for example. Accordingly, a bottom transverse frame member 32' on the rear skeletal wall 32 of the farrowing crate 20, which frame member 32' may be the threshold portion of the corresponding entrance into the farrowing crate from the rear aisle space for example, is provided with a pair of transverse slots 32" therethrough which are open at the forward edge of the transverse frame member 32'. The slots 32" are spaced apart from each other so that they are located adjacent the longitudinal side portions of the opening 50, and each of the slots 32" is penetrated by the substantially vertical leg of a substantially L-shaped anchor member or bolt means 56.

The bolt means or anchor members 56 are of such size that they may readily pass through openings 52 in the grate 51, and the lower portions of the anchors 56 extend outwardly beneath and in engagement with the underside or lower surfaces of the slats defined by the opposite sides of the opening 50 and the next adjacent slots 40 in the gang slat 10. The substantially vertical portions of the anchor members 56 are threaded at their upper portions for receiving respective nuts 57 thereon for securing the farrowing crate 20 and the grate 51 in the desired position as the substantially horizontal lower portions of the anchor members 56 are forced upwardly against the lower surface of the gang slat 10 by the nuts 57.

Figure 8:
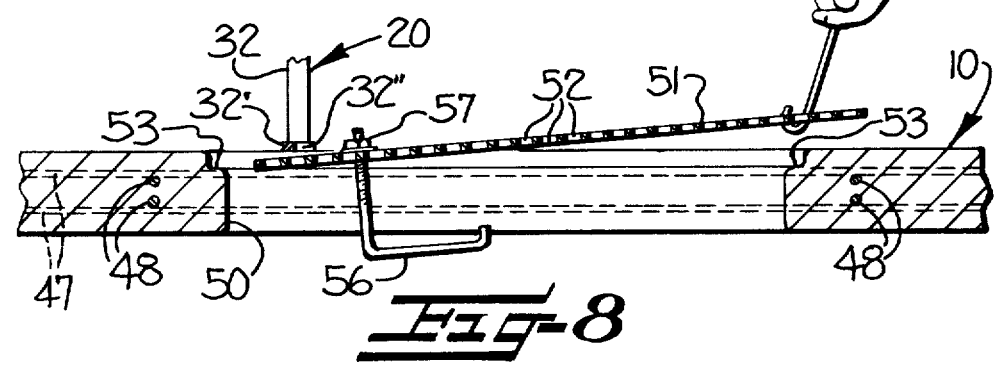
FIG. 8 is a view similar to FIG. 7, but illustrating how the grate means may be removed from the gang slat for permitting access to the pit therebeneath.

As indicated earlier herein, it is preferred that the grate openings 52 are elongate in the longitudinal direction of the grate 51 and the gang slat 10. This is desirable for aiding in aligning the anchor members 56 in grate 51 with the slots 32" in frame member 32' of the farrowing crate 20 during installation of the grate 51 in the opening 50, as will be presently described. In this regard, it can be seen in FIGS. 6 and 7 that the grate 51 extends rearwardly a relatively short distance beyond the rear wall portion 32 of the farrowing crate. As shown in FIG. 8, the grate 51 may be readily removed from beneath the frame member 32' and then from the opening 50 by an attendant simply loosening the nuts 57, without necessarily removing them from the anchor members 56, then turning the anchor members 56 so that their lower portions are free of the lower surface of the gang slat 10, and then sliding the grate 51 forwardly (to the right in FIGS. 7 and 8) as the rear portion of the grate 51 is slid upon the shoulder means 53 at opposite sides of the opening 50.

During the forward movement of the grate 51, the rear edges of respective openings 52 in the grate 51 engage and move the respective anchor members 56 out of the slots 32", as in FIG. 8, thus permitting the anchor members 56 to drop until their nuts 57 (or washers therebeneath) engage the grate 51 to suspend the anchor members 56 from the grate 51. Upon the rear edge of the grate being moved forwardly of the frame member 32', the attendant may lift the grate 51 away from the opening 50 to facilitate further cleaning of the gang slat and permit access therethrough to the pit 15 therebelow.

The grate 51 may be installed in the opening 50 by placing opposite rear corner portions thereof upon portions of the recessed shoulder means 53 at opposite sides of the opening 50, and then sliding the grate 51 rearwardly beneath the frame member 32', during which the anchor members 56 may be raised manually and inserted in the slots 32" in the frame member 32' with the nuts 57 overlying the frame members 32'. The anchor members 56 are manually rotated to position their lower portions underneath the adjacent side portions of the gang slat 10, and then the nuts 57 are tightened to complete securement of the grate 51 and the frame member 32' of the farrowing crate 20 to the gang slat 10.

From the foregoing description, it can be seen that there is provided an improved gang slat for use as a floor section in an animal shelter, which gang slat is adapted to underlie and support a farrowing crate 20 thereon having a central pen 21 for confining a sow therein and side pens 22 extending along opposite sides of the central pen 21 for confining a newborn litter of pigs in close proximity to the sow, and wherein the gang slat 10 is so constructed as to avoid the need for the prior practice of temporarily placing a mesh grate over slotted rear portions of the gang slat to protect the feet and legs of the pigs during birth and initial growth of the pigs.

In the drawings and specification there has been set forth a preferred embodiment of the invention, and although specific terms are employed, they are used in a generic and descriptive sense only, and not for purposes of limitation.

That which is claimed is:

1. A gang slat for use as a floor section in an animal shelter for newborn pigs and adapted to underlie and support a farrowing crate having a central pen for confining a sow therein and side pens extending along opposite sides of the central pen for confining a newborn liter of pigs in close proximity to the sow, said gang slat comprising a central section formed from reinforced concrete and having a front portion and a rear portion adapted for supporting thereon respective front and rear portions of the sow in the central pen, opposing side sections also formed from reinforced concrete and integrally with said central section, said side sections extending along opposite sides of said central section and being adapted to support the litter in the side pens, and said side sections having a plurality of openings therein for passage therethrough of waste from the litter of pigs, said rear portion of said central section of the gang slat having a relatively large opening therein which constitutes at least a substantial portion of said rear portion, shoulder means at least partially defining the perimeter of said large opening and being recessed relative to the upper surface of the gang slat, grate means carried by said rear portion of the gang slat central section and positioned in said opening and engagingly supported upon said recessed shoulder means with the upper surface of said grate means being positioned no higher than the upper surface of the gang slat, the openings in said grate means being sufficiently small so as to permit the litter of pigs to be born thereon and walk thereon without injury as by their feet being caught in the openings and wherein the openings are of sufficient size and number for readily permitting the sow's and the newborn pigs' waste to pass therethrough, and fastening means for securing said grate means within said opening.

2. A gang slat according to claim 1 wherein said grate means is of elongate configuration and is of a width about the same as the width of said gang slat central section.

3. A gang slat according to claim 1 wherein said shoulder means is recessed relative to the upper surface of the gang slat to such depth that the upper surface of said grate means in said opening is spaced below the level of the upper surface of the gang slat when said grate means is supportingly received upon said shoulder means.

4. A gang slat according to claim 1 wherein said openings in said grate means are elongate and each of said openings is no wider than about ⅜ inch (9.53 mm), the combined area of said openings in said grate means being at least about thirty percent (30%) of the total effective area of the grate means, and said openings being generally uniformly distributed over the grate means.

5. A gang slat according to claim 1 wherein said grate means is of elongate substantially rectangular configuration and of a width about the same as that of said central section of the gang slat, said openings in said grate means being elongate in the elongate direction of said grate means and being no wider than about ⅜ inch (9.53 mm), and the combined area of the openings in said grate means being at least about thirty percent (30%) of the total effective area of said grate means.

6. A gang slat according to claim 1 wherein said front portion of the gang slat central section is provided with a plurality of slots therein for passage of air and waste therethrough.

7. A gang slat according to claim 1 including a rear end section also formed from concrete and integrally with said central and side sections, said rear end section being positioned adjacent said central and side sections and defining a rear end of the gang slat, at least the major portion of said opening in said rear portion of the gang slat central section being located forwardly of said rear end section, and said rear end section being adapted to be positioned entirely exteriorly of the associated farrowing crate for serving as a side aisle floor.

8. In an animal shelter for newborn pigs and within which a plurality of farrowing crates are arranged in opposing rows, each farrowing crate having a central pen for confining therein a sow, and side pens extending along opposite sides of the central pen for confining a litter of newborn pigs in close proximity to the sow, and wherein a center aisle is disposed between said opposing rows for access to the farrowing crates, the combination therewith of a plurality of gang slats forming floor sections in the shelter and being arranged in rows to underlie and support the respective rows of farrowing crates, each gang slat comprising a central section formed from reinforced concrete and having a front portion and a rear portion adapted to support respective front and rear portions of a sow in the central pen of one of the farrowing crates, and opposing side sections formed integrally with said central section and extending along opposite sides of said central section, said side sections being adapted to support the litter in the side pens of the respective farrowing crate and having a plurality of openings therein for passage therethrough of the waste from the litter of pigs, said rear portion of said central section of each gang slat having a relatively large opening therein which constitutes at least a substantial portion of said rear portion, shoulder means at least partially defining the perimeter of said large opening and being recessed relative to the upper surface of the gang slat, grate means carried by said rear portion of the gang slat central section and positioned in said opening and engagingly supported upon said recessed shoulder means with the upper surface of said grate means being positioned no higher than the upper surface of the gang slat, the openings in said grate means being sufficiently small so as to permit the litter of pigs to be born thereon and walk thereon without injury as by their feet being caught in the openings and wherein the openings are of sufficient size and number for readily permitting the sow's and the newborn pigs' waste to pass therethrough, and fastening means for securing said grate means within said opening.

9. An animal shelter according to claim 8 wherein the openings in said grate means are elongate and are each no wider than about ⅜ inch (9.53 mm), and wherein the combined area of said openings is at least about thirty percent (30%) of the total effective area of the grate means.

10. An animal shelter according to claim 8 wherein said grate means is elongate substantially rectangular configuration and of a width about the same as that of said central section of said gang slat, said openings in said grate means being elongate in the elongate direction of said grate means and being no wider than about ⅜ inch (9.53 mm), and the combined area of the openings being at least about thirty percent (30%) of the total effective area of the grate means.

11. An animal shelter according to claim 8 wherein each farrowing crate has a frame member thereof extending over and across the opening in the rear portion of the central section of the respective gang slat, and said fastening means includes means for securing the farrowing crate and the respective grate means to the respective gang slat including anchor means extending through said frame member and through openings in said grate means and engaging the underside of the respective gang slat.

12. An animal shelter according to claim 8 wherein each farrowing crate comprises a frame having a frame member extending over and across said opening in said rear portion of the gang slat central section and overlying a rear portion of said grate means, said frame member having at least two slots therein extending rearwardly from the forward edge of said frame member and being open at their front ends, said fastening means securing the farrowing crate and said grate means to the respective gang and including bolt means positioned in each of said slots in said frame member and extending downwardly through respective openings in said grate means, means on lower portions of said bolt means and projecting laterally therefrom for engaging the underside of the gang slat adjacent opposite sides of said opening therein, and threaded means threadedly engaging upper portions of each bolt means for securing said frame member of the farrowing crate and said grate means to the gang slat, the slots in said frame member permitting said grate means to be withdrawn forwardly from beneath said frame member as said bolt means are being moved forwardly out of said slots with said grate means following loosening of said threaded means on said bolt means by an attendant.

13. An animal shelter according to claim 12 wherein said bolt means extend through respective ones of said openings in said grate means, and wherein said openings in said grate means are elongate in the forward and rearward directions of the gang slat and the grate means and thereby serve to aid in aligning said bolt means with said slots in said frame member.

14. An animal shelter according to claim 13 wherein each of said elongate openings in said grate means is no wider than about ⅜ inch (9.53 mm), and wherein the combined area of the openings in each grate means is at least about thirty percent (30%) of the total effective area of the grate means.

* * * * *